Jan. 8, 1935.  E. A. REUSSENZEHN  1,987,245
MAGNIFYING DEVICE FOR SCALES
Filed Sept. 6, 1933
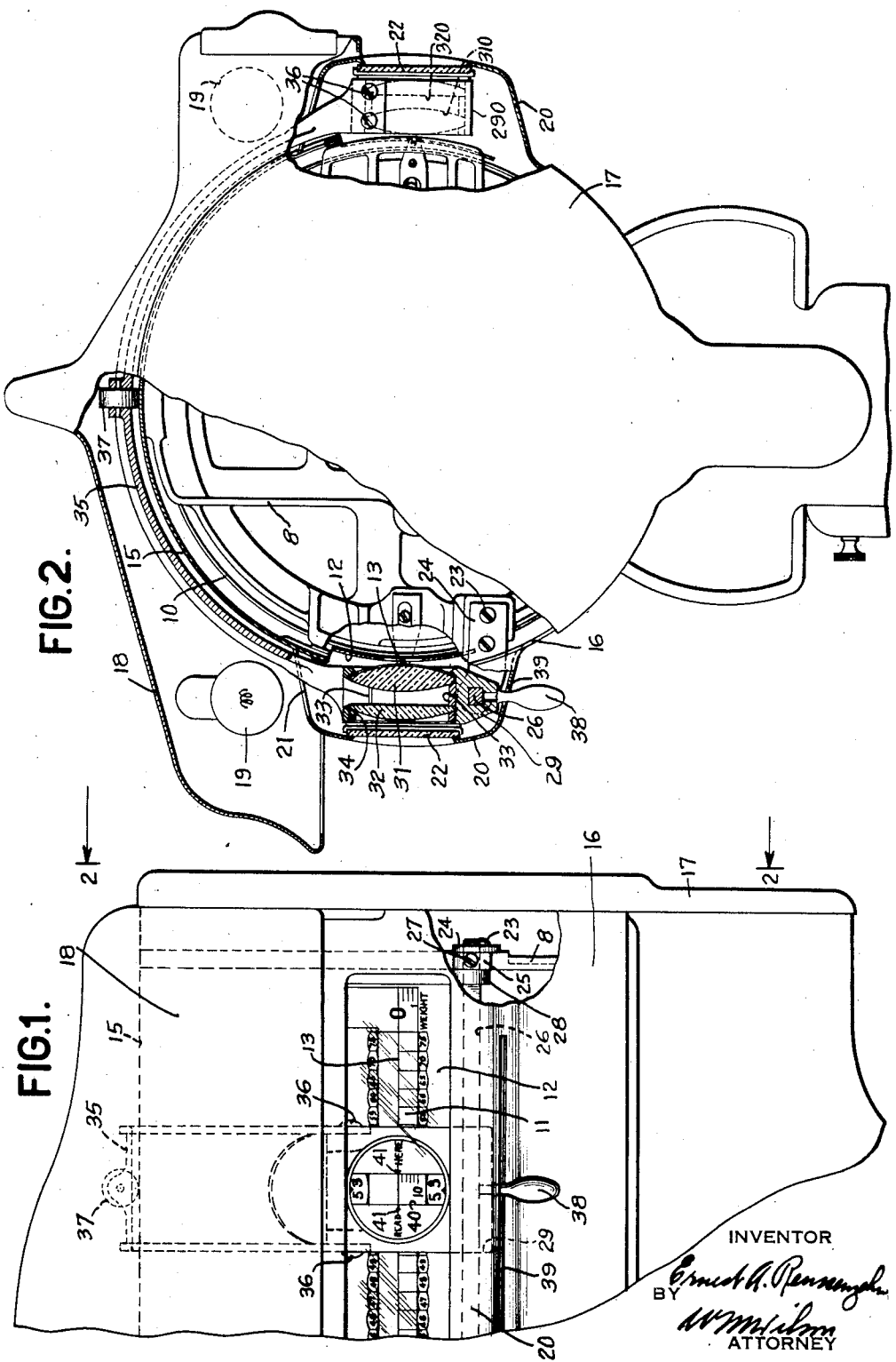

Patented Jan. 8, 1935

1,987,245

UNITED STATES PATENT OFFICE 1,987,245

MAGNIFYING DEVICE FOR SCALES

Ernest Albert Reussenzehn, Dayton, Ohio, assignor to International Business Machines Corporation, New York, N. Y., a corporation of New York Application September 6, 1933, Serial No. 688,275

3 Claims. (Cl. 88—1)

This case relates to a magnifying lens movable along the drum chart of a weighing scale to read different price columns of the chart.

In use, these lenses have been located exteriorly of the scale as shown in Patent No. 1,804,464. One disadvantage of this arrangement is the possibility that in handling the goods on the platform of the scale, the merchant may strike the lens with the goods and fracture or mar the lens. Another disadvantage is that anyone near the scale may freely handle the lens and scratch it, break it, or even abstract it without much difficulty. Still another disadvantage is that the lens quickly becomes dirty and must be continually cleaned by the merchant. A further disadvantage is that the lens has the evident look of a separate attachment whereas it is desired to sell and use the scale as a homogeneous unit in both appearance and operation.

To overcome the above disadvantages, the present invention contemplates the provision of a magnifying lens device which is completely housed and guarded yet adjustable along the price columns from the exterior of the scale.

Further the object is to provide the housing for the lens as an integral unitary part of the scale housing.

The invention also contemplates the provision of a magnifying lens at each side of the scale with a novel carrier for the lenses and arranged to be inaccessible to the customer for moving the reading device.

Various other objects and advantages of the invention will be obvious from the following particular description of one form of mechanism embodying the invention or from an inspection of the accompanying drawing; and the invention also constitutes certain new and novel features of construction and combination of parts hereinafter set forth and claimed.

In the drawing:

Fig. 1 is a front view from the merchant's side of a portion of the scale embodying the invention, and Fig. 2 is an end view looking at Fig. 1 in the direction of the arrows 2—2, with part of the housing sectioned to show the interior.

Rotatably mounted on end frames 8 is a cylinder or drum chart 10 having parallel columns 11 of values which are products of weight by price per pound, each column being figured on a different basic price, which is marked in line with the column on a price plate 12. For indexing the chart, the usual hair line 13 is provided. All these parts are duplicated at the customer's side of the scale, the chart being of the type having opposite halves marked with duplicate indications, as disclosed in Patent No. 1,918,677. Any suitable weighing mechanism may be used to rotate the chart, for example, the one disclosed in Patent No. 1,690,258.

The housing of the scale includes a drum casing comprising an upper half 15 and a lower half 16, end caps 17, and an illuminating head 18 with lamps 19.

The lower half 16 is formed with pressed-out bosses 20 at each side extending the full width of the chart 10 and having upper openings 21 through which the light from lamps 19 enters the bosses. The front of each boss 20 is cut away to form a sight opening which is covered by a plain glass window 22 secured to the boss.

At the merchant's side of the scale, each end frame 8 has secured thereto a bracket 24. Each bracket extends forwardly of the end frame towards the merchant's side of the scale and is formed with a laterally extending hub portion 25 having a square opening to receive one end of a square rail 26 extending parallel to the axis of the chart.

The rail is held in place by a set screw 27 threaded into each hub portion 25. Rubber bumpers 28 are provided on the rail at the inner side of each hub portion for contacting the ends of the frame 29 which is slidably mounted on the rail 26.

Frame 29 carries the merchant's magnifying lens which is of the orthoscopic type having two lens elements 31 and 32. The lenses are separated by a spacing collar 33 and held in place by a threaded element 34 screwed into the front of the frame 29.

At the customer's side of the scale within boss 20 is located a frame 290 substantially similar to frame 29 and similarly carrying lens elements 310 and 320 in back of sight window 22. The frames 29 and 290 are connected by a generally semi-circular bracket 35 guarded and housed by the illuminating hood 18 and the sides of which are secured at their opposite ends to the sides of the frames by means of screws 36. The top of bracket 35 carries a roller 37 which rides on the top of the upper drum casing half 15.

Rail 26 coacting with frame 29 and casing 15 coacting with roller 37 support the assembled reading devices for slidable movement in a direction parallel to the chart axis.

Adjacent openings 21 in the bosses 20, the frames 29 and 290, their lens spacing collars 33, and bracket 35 are cut out to form passages through which the light from lamps 19 may reach and illuminate the portions of chart behind the lenses.

Depending from frame 29 is a handle 38 which passes through a slot 39 in the boss 20 at the merchant's side and is adapted to be grasped by the merchant for moving the opposite magnifying devices from column to column. The reading assembly cannot be moved from the customer's side, thereby eliminating the annoyance of having the customer interfere or tamper with the adjustment of the assembly.

To facilitate the reading of the chart, the element 34 is formed with a narrow opening 40 uncovering the lenses 31 and 32 for the width of only a single chart column. The lenses extend across the width of the price plate 12 to magnify the basic prices as well as the chart figures. Thus, only a single definitely indicated column is disclosed for view at any one time to the observer, preventing confusion in reading the chart as might be the case were more than one column simultaneously magnified. To prevent parallax errors, each element 34 has two index arrows 41 in the reading plane of hair line 13.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is as follows:

1. In a scale of the type having a rotary drum chart with parallel value columns and a head casing enclosing the chart; the combination of a housing portion extending from an intermediate portion of the head casing and having a face disposed generally parallel to a line tangential to the chart, said face being provided with a sight opening, a transparent closure covering said opening and secured to said face, a magnifying device entirely enclosed and guarded by said housing portion and located between the transparent closure and the chart for providing a virtual image of the chart, means rigid relative to the head casing for supporting and guiding the device for movement along the chart to read different columns, and means for moving the enclosed lens from column to column of the chart.

2. In a scale of the type having a rotary drum chart with parallel value columns and a head casing enclosing the chart; the combination of a housing portion rigid with the head casing and provided with a sight window, a magnifying device enclosed and guarded by the housing portion and located between the sight window and chart for reading the latter, means rigid relative to the head casing for mounting the device for movement along the chart to read different columns, said housing portion having a slot extending along the chart, and a handle connected to the device and projecting through said slot to the exterior of the scale to be grasped by the operator for moving the device along the chart.

3. In a scale of the type having a rotary drum chart with parallel value columns duplicated on each half of the chart to provide customer and merchant value indications and a head casing enclosing the chart; the combination of a pair of housing portions rigidly extending from the head casing and projecting outwardly of the casing, one such portion being provided at the merchant's and the other at the customer's side of the scale, each portion having a sight window, a pair of magnifying devices, each guarded and enclosed by one of the housing portions and located between the sight window of said portion and the chart at the adjacent side, a connection between the devices for causing them to move jointly, means rigidly provided on the scale for guiding the devices for movement along the chart to read different value columns, and a handle connected to the magnifying device at the merchant's side and extending through the corresponding housing portion exteriorly of the latter to be grasped by the merchant for jointly moving the devices to the duplicate columns of the chart to be read, said devices being inaccessible for operation except by said handle.

ERNEST ALBERT REUSSENZEHN.